United States Patent Office 3,068,184
Patented Dec. 11, 1962

3,068,184
POLYVINYL CHLORIDE POLYMERS
Arnold Noorduyn and Ferdinand Adriaan Doorman, Rotterdam, Netherlands, assignors to Shell Oil Company, a corporation of Delaware
No Drawing. Filed Jan. 15, 1957, Ser. No. 634,141
Claims priority, application Netherlands Jan. 17, 1956
8 Claims. (Cl. 260—23)

This invention relates to novel polymeric compositions and processes and their preparation. More particularly, it relates to compositions of polyvinyl chloride which are characterized by improved electrical properties.

Various polymers, such as polyvinyl chloride, are commonly prepared by treating a polymerizable monomer with a polymerization catalyst in the presence of an emulsifying agent. The polymer thus prepared is usually washed and/or otherwise treated before it is separated from the polymerization mixture. As it applies to polymers as polyvinyl chloride, such products have a multitude of uses but they have, in the main, exhibited poor electrical properties. In order to improve the electrical properties numerous techniques and improvements have been described. The result has been that polymers such as polyvinyl chloride now find extensive utility because of their valuable electrical properties. By the present invention it has now been found that certain electrical properties, particularly the specific resistivity, of polyvinyl chloride compositions may be greatly improved.

It is an object of this invention to provide novel polymeric compositions, particularly polymeric compositions of polyvinyl chloride. It is another object of this invention to provide compositions of polyvinyl chloride which have improved electrical properties. It is still a further object of this invention to provide compositions of polyvinyl chloride which have improved specific resistivity. It is yet another object of this invention to provide methods for the preparation of polyvinyl chloride compositions having improved specific resistivity. Other objects will become apparent as the description proceeds.

These and other objects are accomplished by treating a composition comprising polyvinyl chloride, prepared in the presence of an emulsifying agent and a polymerization catalyst, with a lower organic acid or metal salt thereof. The resultant product having the improved electrical properties will be obtained irrespective of the numerous methods which may be used to polymerize the vinyl chloride. By way of illustration, it may be stated that the polymer may be treated while it is still in an emulsified form. Alternatively, the polymer which is first in an emulsion, may be separated, washed if desired, then treated with the acids or salts of the type indicated. By another embodiment the polymer may be treated first with a lower organic acid followed by the addition of a suitable base whereupon a salt of the lower organic acid will be formed in situ. Still other procedures will become apparent as this description proceeds.

As previously indicated, the polymerization of the vinyl chloride may be conducted by any known means. One commonly used method is to manufacture polyvinyl chloride in an emulsion system wherein there is used an ammonium salt of a mono-basic acid of 8 to 20 carbon atoms as the emulsifying agent while also using a peroxide polymerization catalyst. The emulsion polymerization is generally conducted at a pH ranging from 8.5 to 11, with a pH from about 9.0 to about 9.5 being preferred. The pH is simply adjusted by the quantity of the emulsifying agent used. Heretofore the polymer has been treated to remove, as completely as possible, the residual emulsifying agent. This has been a particularly difficult operation since considerable amounts of the emulsifying agent is carried over and occluded in the polymer and is itself an ionizable substance giving rise to conduction of electricity.

The emulsifying agent employed in producing polyvinyl chloride embraces a variety of substances. In general, this emulsifying agent is an ammonium salt of an organic acid having the acid group selected from the class consisting of carboxylic acid, sulfonic acid, and hydrogen sulfate groups, which acid group is linked directly to a radical containing 8 to 20 carbon atoms which is otherwise free of salt-forming and ionizable groups. Particularly suitable are the ammonium salts of the higher fatty acids such as ammonium caprate, laurate, myristate, palmitate, stearate, arachidate, oleate, or linoleate as well as ammonium salts of other higher monocarboxylic acids such as ammonium para-tertiary butyl benzoate, isopropyl benzoate, beta-cyclohexylpropionate or rosinate. Also suitable are ammonium salts of lauryl sulfonic acid, stearyl sulfonic acids, sulfonated castor oil, sulfonated mineral oil, alkyl benzene sulfonic acid, and dioctyl sulfosuccinate as well as ammonium salts of lauryl hydrogen sulfate, stearyl hydrogen sulfate, and the like. If desired, mixtures of two or more ammonium salt emulsifying agents are used.

In effecting the emulsion polymerization of the vinyl chloride, the amount of ammonium salt emulsifying agent contained in the aqueous phase may be varied considerably. Based upon the weight of aqueous phase, the concentration is ordinarily about 0.1 to 2%, although it may be up to 5%. Very good results are obtained with use of about 0.5% by weight of ammonium salt emulsifying agent in the aqueous phase. A preformed ammonium salt may be employed, or the ammonium salt may be formed in situ by adding ammonia (aqueous ammonium hydroxide solution being convenient) to the water and adding the acid to the liquid vinyl chloride so that upon bringing the monomer into admixture with the aqueous phase, the ammonium salt emulsifying agent is formed. In this latter case, the amounts of ammonia and acid are so chosen to give the desired quantity of salt. Exact neutralization is not necessary since a small excess of either the acid or the ammonia may be present in the polymerization system, preferably the acid in excess.

Any peroxy polymerization catalyst may be used for the compositions and methods of this invention. Suitable catalysts include for example, lauroyl peroxide, caprylyl peroxide, stearoyl peroxide, benzoyl peroxide, acetylbenzoyl peroxide, p-chlorobenzoyl peroxide, 2,4-dichlorobenzoyl peroxide, tertiarybutyl perbenzoate, and the like. The amount of peroxide used is not very critical. While proportions greater or less than the 0.1 to 5% by weight based upon the weight of monomer may be employed, it is in general preferred to use about 0.2 to 1%. Very good results are obtained with lauroyl peroxide or hydrogen peroxide.

If desired, other polymerizable compounds may be used with the vinyl chloride. Such polymerizable compounds are characterized by the presence of the group $CH_2{=}C{<}$ and includes, for example, vinyl bromide, vinyl acetate, vinyl formate, vinyl benzoate, vinylidene chloride, methyl acrylate, acrylonitrile, methyl methacrylate, styrene and the like.

The vinyl chloride containing the peroxide catalyst is mixed and emulsified with an aqueous solution containing the emulsifying agent. Based upon the weight of vinyl chloride, about 200 to 500% of aqueous solution is used. While larger proportions may be employed, their use is generally avoided because no advantage is realized. In fact, larger proportions result in necessity of correspondingly larger equipment and processing costs which are undesirable. On the other hand, lower proportions may be used advantageously. In general, about 300% aqueous solution gives good results and is used although from about 250 to 400% is also very suitable.

The actual polymerization may be conducted in any suitable fashion. One such method is by a continuous process whereby emulsifier and monomer, or monomers, are added continuously and from which a part of the reaction mixture is drawn off continuously and addition and withdrawal take place at such a rate that the composition of the reaction mixture remains substantially the same. A very suitable embodiment of the continuous process is that in which the monomer is introduced into the reaction space in the form of an aqueous emulsion. The continuous process may also be carried out, for instance, by the use of the "Seppol process," in which a stream of monomer drops are passed through the aqueous phase containing the emulsifier and catalyst, separated, and preferably again passed through the aqueous phase. The polymerization may also be conducted by conventional batch procedures.

According to this invention after the polymerization is complete, the polymerized mixture, or the polymer itself, is so treated so as to convert the emulsifier to an insoluble or substantially insoluble compound. In essence, the invention comprises treatment of the polymer with a metal salt of a lower organic acid. The acid constituent may have from one to six carbon atoms and includes, for example, formic, acetic, propionic, caproic, trimethylacetic acids, and the like. Acids having a greater number of carbons atoms may also be used but they are considerably less satisfactory as they become too insoluble in water to be efficient. The metal for the salt is derived from metals which will form a salt of the lower organic acid. Metals which are suitable include potassium, sodium, copper, tin, lead, iron, nickel, and the like. The most preferred salts are derived from metals of groups I and II of the periodic table including calcium, barium, cadmium, and the like. Suitable salts include formates of calcium, barium, copper, nickel, tin, etc., also, similar acetates, butyrates, caproates, and the like.

As previously indicated the actual treatment with metallic salts may be accomplished by any one of several methods. If desired, the metal salt of the lower organic acid is added directly to the emulsion whereupon the polymer is coagulated. The salts are preferably used in the form of an aqueous solution having a concentration of less than 10% by weight. In many cases, a concentration of from 1 to 5% by weight is sufficient. The addition of the salt is preferably conducted at elevated temperatures in the order of 40 to 80° C. with temperatures from about 50 to 70° C. being preferred. After the addition of the salt the mixture is agitated for a period of time sufficient to permit the coagulation to be complete. The time required will vary on a number of factors such as the temperature, the particular emulsifying agent involved, the particular salt of the lower organic acid, the size of the batch, and the like. Normally 30 minutes of continued agitation is sufficient. After this treatment is complete, the coagulate is separated by any conventional means such as filtration, centrifuging, and the like. Thereafter, the coagulate is washed with water. If desired, the washed product may be treated with an ammonia solution followed by washing again with water. It is sometimes advantageous to subject the coagulate to a heat treatment for varying periods of time being generally less than 30 minutes, at a temperature from 80 to 160° C. with 100 to 150° C. being preferred. This treatment which is generally conducted from about 1 to 15 minutes is preferably applied before the coagulate is separated.

Another method of coagulating the polymer is to treat the emulsion of the polymer with a lower organic acid of the type indicated above. Such a coagulation is usually carried out at temperatures ranging from 40 to 80° C. If desired, the coagulate may be treated with an ammonia solution followed by a heat treatment to separate the coagulated product. The optional heat treatment at this point is continued under about the same conditions indicated above. Thereafter, if the optional heat treatment is used, the polymer is treated with an aqueous solution of the ionizable metal compound after which the product is washed with water and then dried.

It will be observed that the treatment of the emulsion with the lower organic acids or metal salts thereof in effect converts the fatty acids present in the emulsifier to insoluble soaps. Therefore, the quantity of the metal salt of the lower organic acids which is ultimately required should be at least stoichiometrically equivalent to the quantity of the emulsifier present. If desired, slight excesses may be used in order to ensure complete conversion but it will be readily understood that such excesses will normally be washed out during the after-treatment.

The invention is described in greater detail in the following examples.

*Example I*

Two kgs. of vinyl chloride, 0.6 liter of a 0.1% hydrogen peroxide solution, 0.45 liter of a 15% aqueous ammonium laurate solution, and 5 liters of water are fed per hour into a stirred reactor. The resultant emulsion has a pH of approximately 9.3. The polymerization is carried out at a temperature of 49–50° C. and a pressure of 5.5–5.8 atm. gauge. Eight kgs. of polymer latex are drawn off per hour, which latex contains approximately 22% by weight of polyvinyl chloride. The reaction time is approximately 4½ to 5 hours with a conversion of 80–95% and a polymer formation rate of 40–45 grams per liter per hour. The latex formed is diluted with water until the concentration of the polymer in the latex is 10%. The latex thus diluted is coagulated with 15 grams of calcium formate per kg. of polyvinyl chloride. The calcium formate is used in the form of a 5% aqueous solution. During the coagulation a temperature of 50–60° C. is used. After the latex is in contact with the calcium formate solution for approximately 20 minutes, the coagulated product is separated by centrifuging and washed twice with water at 60° C. This washing is carried out by suspending the coagulate in water and centrifuging the slurry formed. The resultant product is then dried at elevated temperature. On analysis it is found that the product contains 0.35% by weight of calcium and 3.2% by weight of fatty acid. Assuming that the calcium is present in the form of calcium laurate, a laurate content of 3.8% is arrived at, calculated on the weight of the polyvinyl chloride. Applying the same reasoning to the fatty acid content, a calcium laurate content of 3.5% by weight is found.

*Example II*

Since in working up polyvinyl chloride the polymer must always be mixed with a plasticizer and a stabilizer to a specific composition, the specific resistivity measurements must be applied to these compositions. Thus, a composition is prepared (hereinafter referred to as composition A), consisting of 100 parts of polyvinyl chloride, prepared according to the method of Example I, 50 parts of dioctyl phthalate and 2 parts of dibasic lead stearate. This composition has a specific resistivity of $550 \times 10^{11}$ ohm-cm. Compared to a specific resistivity of $190 \times 10^{11}$ ohm-cm. for a composition consisting of polyvinyl chloride, prepared by the method of Example I, 50 parts of dioctyl phthalate, 5.5 parts of white lead and 1 part of calcium stearate. This latter composition (hereinafter referred to as composition B) will be recognized as being more nearly of the type usually employed for electrical applications. It will be found that the specific resistivity of compositions of the A-type invariably are much higher than the B-type and may be as much as 8 times higher.

*Example III*

Polyvinyl chloride is prepared as in Example I except that after coagulation with the calcium formate solution, the polymer is heated to 110° C. for approximately 10 minutes, after which it is worked up. When used as in composition B, a specific resistivity of $240 \times 10^{11}$ ohm-cm. is obtained.

*Example IV*

The polyvinyl chloride prepared according to Example I is treated after washing with 1% NH$_4$OH, again washed, and then further worked up in the manner described. The treatment lasts for 30 minutes and is carried out at a temperature of 40° C. The polyvinyl chloride thus worked up is used as in composition A. The specific resistivity is found to be in the order of $800$–$1000 \times 10^{11}$ ohm-cm. When used in composition B the specific resistivity is $370 \times 10^{11}$ ohm-cm.

*Example V*

The polyvinyl chloride prepared in Example I is treated as in Example III followed by treatment with NH$_4$OH as in Example IV. It is then made up into compositions as A and B above. The specific resistivity of composition A is $640 \times 10^{11}$ ohm-cm. and the specific resistivity of composition B is $270 \times 10^{11}$ ohm-cm.

*Example VI*

The procedure of Example I is repeated except that 28 grams of barium formate per kg. of polyvinyl chloride is used instead of calcium formate. The barium formate is used as a 5% solution. When using the resultant polyvinyl chloride in compositions A and B, the following values of the specific resistivity are obtained:

|  | Ohm-cm. |
|---|---|
| Composition A | $540 \times 10^{11}$ |
| Composition B | $310 \times 10^{11}$ |

*Example VII*

A cadmium formate solution (25 grams per kg. of polyvinyl chloride) is added instead of the calcium formate of Example I. When employing the resultant polyvinyl chloride in compositions A and B, the following specific resistivities are obtained:

|  | Ohm-cm. |
|---|---|
| Composition A | $640 \times 10^{11}$ |
| Composition B | $175 \times 10^{11}$ |

*Example VIII*

The polyvinyl chloride of Example VII is treated with 1% NH$_4$OH as in Example IV. The polyvinyl chloride thus prepared is used as in compositions A and B with the following results:

|  | Ohm-cm. |
|---|---|
| Composition A | $780 \times 10^{11}$ |
| Composition B | $185 \times 10^{11}$ |

*Example IX*

When lead formate is used instead of the calcium formate of Example I it is found that the polyvinyl chloride thus obtained when used as in composition A has a resistivity of $250 \times 10^{11}$ ohm-cm.

*Example X*

The procedure of Example IX is repeated except that an additional treatment of polyvinyl chloride with 1% NH$_4$OH is used as in Example IV. The polyvinyl chloride thus prepared is used as in composition A which has a specific resistivity of $470 \times 10^{11}$ ohm-cm.

*Example XI*

The latex prepared according to Example I is spray-dried by the use of a Nubilosa spray-dryer. The spray-dried product is treated with a ten-fold quantity of a 1% aqueous calcium formate solution. The slurry formed is stirred for 60 minutes at 60° C. After filtering, washing at 60° C., and drying, the specific resistivity of the polyvinyl chloride is measured in the form of compositions A and B referred to in Example II. When used in composition B a specific resistivity of $110 \times 10^{11}$ ohm-cm. is obtained and when used as in composition A the specific resistivity is $260 \times 10^{11}$ ohm-cm.

*Example XII*

The procedure of Example XI is repeated except that the treatment with calcium formate is carried out for 180 minutes at 90° C. The polymer thus treated is used as in composition B. The specific resistivity is $160 \times 10^{11}$ ohm-cm. and in composition A the specific resistivity is $350 \times 10^{11}$ ohm-cm.

*Example XIII*

When the treatment of the polyvinyl chloride of Example XI with calcium formate is carried out for 60 minutes at a temperature of 110° C., a composition of the A-type has a resistivity of $315 \times 10^{11}$ ohm-cm. and in compositions of the B-type, a resistivity of $140 \times 10^{11}$ ohm-cm. is obtained.

*Example XIV*

The polymer of Example XI is treated with 1% NH$_4$OH at 40–50° C. for about 60 minutes before being treated with calcium formate. The polymer thus treated, when used as in composition B, has a specific resistivity of $130 \times 10^{11}$ ohm-cm., and when used as in composition A has a specific resistivity of $450 \times 10^{11}$ ohm-cm. When the treatment with the calcium compound is carried out for 60 minutes at 110° C., it is found that the polymer has a specific resistivity of $190 \times 10^{11}$ ohm-cm. for compositions of the B-type and a specific resistivity of $450 \times 10^{11}$ ohm-cm. for compositions of the A-type.

*Example XV*

The procedure of Example XI is repeated except that lead formate replaces the calcium formate. The treatment with the lead formate is at 60° C. for 60 minutes. The polyvinyl chloride thus obtained is prepared as in compositions A and B. The specific resistivities are $220 \times 10^{11}$ ohm-cm. and $130 \times 10^{11}$ ohm-cm., respectively.

*Example XVI*

The procedure of Example XV is repeated except that the treatment with lead formate is conducted at 90° C. for 80 minutes. The specific resistivities are $250 \times 10^{11}$ ohm-cm. and $120 \times 10^{11}$ ohm-cm., respectively.

*Example XVII*

The procedure of Example XI is repeated except that the polyvinyl chloride thus prepared is treated with 1% NH$_4$OH at 40–50° C. for about 60 minutes followed by treatment with lead formate. The polyvinyl chloride is then used as in compositions A and B with the following specific resistivities being obtained:

|  | Ohm-cm. |
|---|---|
| Composition A | $270 \times 10^{11}$ |
| Composition B | $130 \times 10^{11}$ |

*Example XVIII*

The procedure of Example I is repeated except that the polyvinyl chloride is coagulated with 15% formic acid. The formic acid is added at the rate of 15 grams per kg. of polyvinyl chloride. The coagulation is carried out over a 15–20 minute period at a temperature of 65° C. To the slurry obtained is added 25% NH$_4$OH so that the total mixture contains ½ of 1% NH$_4$OH. After agitating for 60 minutes at 40° C. the polymer is separated by centrifuging whereupon the polymer is washed with water at 60° C. followed by treatment with 1% calcium formate solution. The suspension obtained is agitated for 60 minutes at 90° C. followed by washing and drying. The polyvinyl chloride thus obtained is prepared as in compositions A and B, referred to in Example II. The specific resistivities are $450 \times 10^{11}$ ohm-cm. and $210 \times 10^{11}$ ohm-cm., respectively.

Example XIX

The procedure of Example XVIII is repeated except that the treatment with $NH_4OH$ is conducted for 10 minutes at 110° C. The compositions A and B have specific resistivities of $400 \times 10^{11}$ ohm-cm. and $190 \times 10^{11}$ ohm-cm., respectively.

Example XX

The procedure of Example I is repeated except that the latex is coagulated with formic acid followed by the addition of calcium hydroxide. Substantially the same results are obtained when the polymer is used as in Example II.

The procedures of the type shown in the above examples are repeated except that acetic acid, sodium acetate, lead acetate, trimethyl acetic acid, calcium acetate, barium caprioate, and the like are used. The results obtained show similar improvement as in the above examples.

It will be readily understood that this invention is capable of numerous modifications without departing from the spirit of the invention. Thus, for example, it will be appreciated that this invention may be practiced even though other emulsifying agents are used in the polymerization. In a similar manner, the invention is operable even though other peroxides and plasticizers are used.

We claim as our invention:

1. In the emulsification polymerization method for producing polyvinyl chloride from vinyl chloride in contact with an ammonium salt of a fatty acid, as an emulsifying agent, and a peroxide polymerization catalyst, the improvement which comprises conducting the polymerization at a pH ranging from 8.5 to 11, coagulating the polyvinyl chloride by forming a water-insoluble salt by reacting the emulsifying agent with a water-soluble metal salt of a lower aliphatic organic acid of 1 to 6 carbon atoms, said water-insoluble salt remaining in the polymer, thereafter washing the polymer with water to remove water-soluble ammonium salts of the lower aliphatic organic acid and separating the polymer from the wash liquid.

2. The method of claim 1 in which the organic acid is formic acid.

3. The method of claim 1 in which the organic acid is acetic acid.

4. The method of claim 1 in which the metal is selected from the group consisting of a metal from groups I and II of the periodic table and lead.

5. The method of claim 1 in which the salt is calcium formate.

6. The method of claim 1 in which the salt is cadmium formate.

7. The method of claim 1 in which the salt is lead formate.

8. The method of claim 1 in which the salt is calcium acetate.

References Cited in the file of this patent

UNITED STATES PATENTS

| | | |
|---|---|---|
| 2,261,611 | Young et al. | Nov. 4, 1941 |
| 2,482,048 | Williams | Sept. 13, 1949 |
| 2,674,585 | Condo | Apr. 6, 1954 |
| 2,716,092 | Leistner et al. | Aug. 23, 1955 |

OTHER REFERENCES

Serial No. 330,310, Ludwig et al. (A.P.C.), published Apr. 20, 1943.